(12) United States Patent
Cheng-I

(10) Patent No.: US 6,655,036 B2
(45) Date of Patent: Dec. 2, 2003

(54) AID APPARATUS FOR LEVEL SURVEYING INSTRUMENT

(76) Inventor: Yang Cheng-I, No. 25-4, Lane 412, Sec. 1, Sea-Tuwn Rd., Taichung (TW)

( * ) Notice: Subject to any disclaimer, the term of this patent is extended or adjusted under 35 U.S.C. 154(b) by 0 days.

(21) Appl. No.: 10/075,290

(22) Filed: Feb. 15, 2002

(65) Prior Publication Data

US 2003/0154611 A1 Aug. 21, 2003

(51) Int. Cl.$^7$ ................................................. G01C 9/22
(52) U.S. Cl. ........................... 33/367; 33/379; 33/365; 33/377
(58) Field of Search ........................... 33/367, 365, 370, 33/377, 379, 354

(56) References Cited

U.S. PATENT DOCUMENTS

| | | | | |
|---|---|---|---|---|
| 3,842,513 A | * | 10/1974 | Clark | 33/367 |
| 3,849,898 A | * | 11/1974 | Turloff | 33/367 |
| 4,231,163 A | * | 11/1980 | Turloff | 33/367 |
| 4,567,669 A | * | 2/1986 | Francis | 33/367 |
| 5,074,049 A | * | 12/1991 | Hung et al. | 33/367 |
| 5,111,588 A | * | 5/1992 | Wung et al. | 33/367 |

* cited by examiner

*Primary Examiner*—Diego Gutierrez
*Assistant Examiner*—Yaritza Guadalupe
(74) *Attorney, Agent, or Firm*—Troxell Law Office PLLC

(57) ABSTRACT

An aid apparatus for level surveying instrument comprises a housing having a receiving chamber therein, two channels at opposite ends of the receiving chamber respectively, a window at one side of the receiving chamber, and a socket opening at the side wall of the housing connecting to receiving chamber via the channel. A controlling member is slidable received in the housing. The controlling member has a movable bar, two seal block disposed at opposite ends of the movable bar for sealing the channel, and a driving member is provided at the housing for driving the controlling to shift, whereby the sealing block being driven by the driving member to seal the channel and to depart from the channel to prevent bubbles formed in liquid.

5 Claims, 4 Drawing Sheets

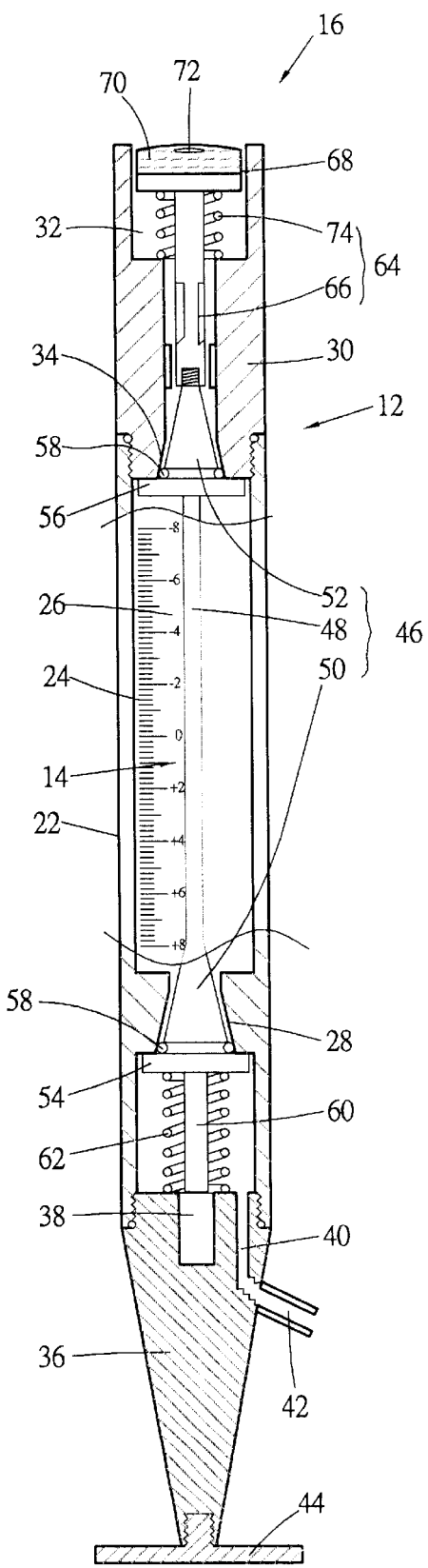
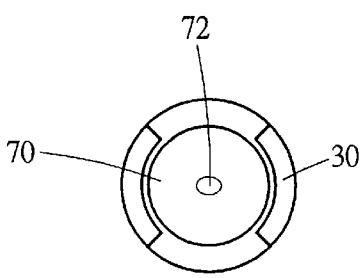
FIG.1
FIG.2

AID APPARATUS FOR LEVEL SURVEYING INSTRUMENT

FIELD OF THE INVENTION

The present invention related to a surveying instrument, and more particularly to an aid apparatus for level surveying instrument.

BACKGROUND OF THE INVENTION

In civil engineering, there are two instruments for surveying the horizontal level of two positions: the leveling rod and the leveling pipe. The leveling rod is for surveying the horizontal level of a short distance, and the leveling pipe is for surveying the horizontal level of a long distance.

The conventional leveling pipe had a soft tube receiving color liquid therein. Two ends of the soft tube are closed by two covers for preventing the color liquid escaping. In operating, user has to turn the covers loose first for air flowing between outside and the soft tube. The surfaces of the color liquid at two ends of the soft tube are position at the same horizontal level caused by the atmospheric pressure. Positioning two ends of the soft tube at two positions, user can identify the horizontal level according to the surfaces of the color liquid at two ends of the soft tube.

To store the conventional leveling pipe, user usually wound the soft tube to decrease the size thereof. Next time, when use the leveling pipe again, user will find air bubbles in the color liquid. These air bubbles will affect the accuracy of the leveling pipe in precise survey. So, user must squeeze the tube for getting the air bubbles out of the color liquid before surveying.

SUMMARY OF THE INVENTION

According to the objective of the present invention, an aid apparatus for level surveying instrument comprises a housing having a receiving chamber therein, a channel at one end of the receiving chamber, a window at one side of the receiving chamber, and a socket opening at the side wall of the housing connecting to the channel. A controlling member is slidable received in the housing. The controlling member has at least one seal block to seal the channel for isolating the receiving chamber from the socket opening, and a driving member is provided at the housing for driving the controlling to shift, whereby the sealing block being driven by the driving member to seal the channel and to depart from the channel to prevent bubbles formed in color liquid.

BRIEF DESCRIPTION OF THE DRAWINGS

FIG. 1 is a sectional view of a first prefer embodiment of the present invention.

FIG. 2 is a topside view of the first prefer embodiment of the present invention.

DETAIL DESCRIPTION OF THE INVENTION

Figure 3:
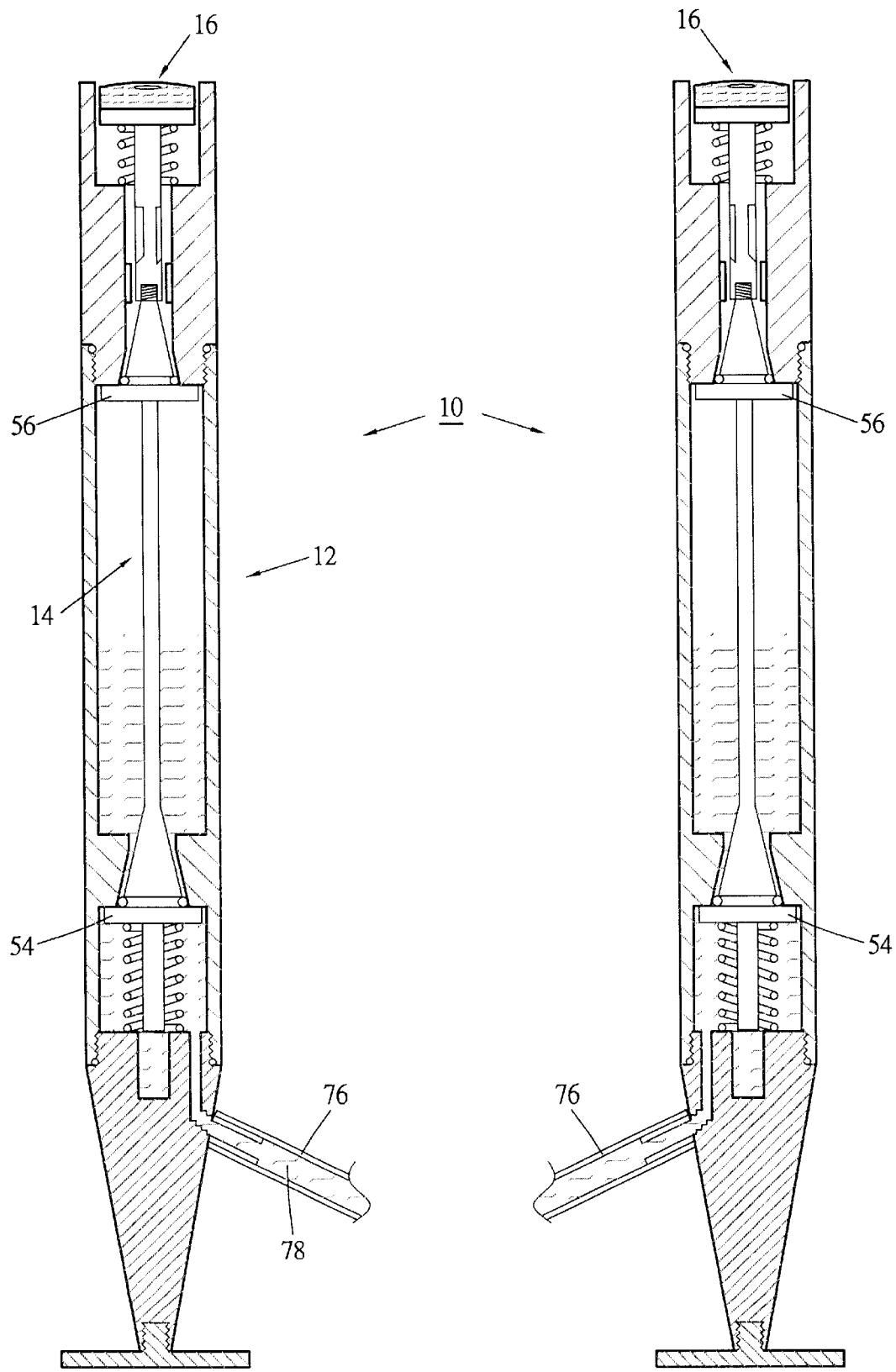
FIG. 3 is a sectional view of the first prefer embodiment of the present invention, showing a soft tube being working with it and a driving member being pressed to drive a controlling member shifting downwardly.

Please refer to FIG. 1 and FIG. 2, the prefer embodiment of the present invention provides an aid apparatus 10 for level surveying instrument mainly consisting of a housing 12, a controlling member 14 and a driving member 16.

The housing 12 has a tube body 22, which is opening at both ends thereof and define a receiving chamber 24 therein. The tube body 22 has a transparent window 26 marked with a scale thereon. The receiving chamber 24 has a taper-shaped channel 28 at bottom end thereof. A first cover 30, which is a tube-like element, secures to the top end of the tube body 22. The first cover 30 has a slot 32 at exterior end thereof and a taper-shaped channel 32 at interior end thereof. A second cover 36 secures to the bottom end of the tube body 22. The second cover 36 has a slot 38 at interior end thereof and a passageway 40 extending from the interior end thereof to the lateral side thereof. A socket opening 42 disposes at the opening end the passageway 40 at lateral side of the second cover 36.

The controlling member 14 has a movable device 46, which consist of a movable bar 48, two end blocks 50 and 52 and two seal blocks 54 and 56. The movable bar 48 is received in the receiving chamber 24 of the tube body 22. The end blocks 50 and 52 are disposed at opposite ends of the movable bar 48 respectively and the seal blocks 54 and 56 are disposed at the outer ends of the end blocks 50 and 52 respectively. Two O-rings 58 are disposed at the end blocks 50 and 52 respectively facing to the seal blocks 54 and 56. A rod 60 is disposed at the exterior end of the seal block 54 at bottom side corresponding to the slot 38 of the second cover 36. An elastic member 62, which is a spiral spring in the present embodiment, mounts on the rod 60 with one end thereof being against the seal block 54 and with the other end thereof being against the second cover 36 to make the seal block 54 sealing the channel 28.

The driving member 16 has a pressing device 64 disposed in the slot 32 of the first cover 30, which consists of a linking rod 66 and a pressing button 68. The linking rod 66 has one end thereof securing to the end block 52 of the movable device 46 and has the other end thereof fastening to the pressing button 68. The pressing button 68 is a hollow, transparent element having liquid 70 received therein. The liquid 70 has a bubble 72. An elastic member 74, which is a spiral spring in the present embodiment, mounts on the linking rod 66 with one end thereof being against the first cover 30 and with the other end thereof being against the pressing button 68 to make the seal block 56 sealing the channel 34.

Please refer to FIG. 3, before operating, user needs to provide two aid apparatuses 10 of the present invention to connect to the opposite ends of a soft tube 76 respectively (only one aid apparatus 10 is shown in FIG.). Each ends of the soft tube 76 secures to the socket opening 42 of the second cover 36. Color liquid 78 is provided in the soft tube 76 and two aid apparatuses 10. User only needs to press the pressing button 68 of two aid apparatuses 10 to make the seal blocks 54 and 56 shifting downwardly. Thus, the receiving chambers 24 are connecting to the soft tube 76 and outside via the channels 28 and 34 respectively for the atmospheric pressure can work on the color liquid 78. Now, put two aid apparatuses 10 at two positions, user can read top surfaces of the color liquid 78 according to the scales on the windows 26 of two aid apparatus 10 to identify whether these two positions are locating at a same horizontal level.

Figure 4:
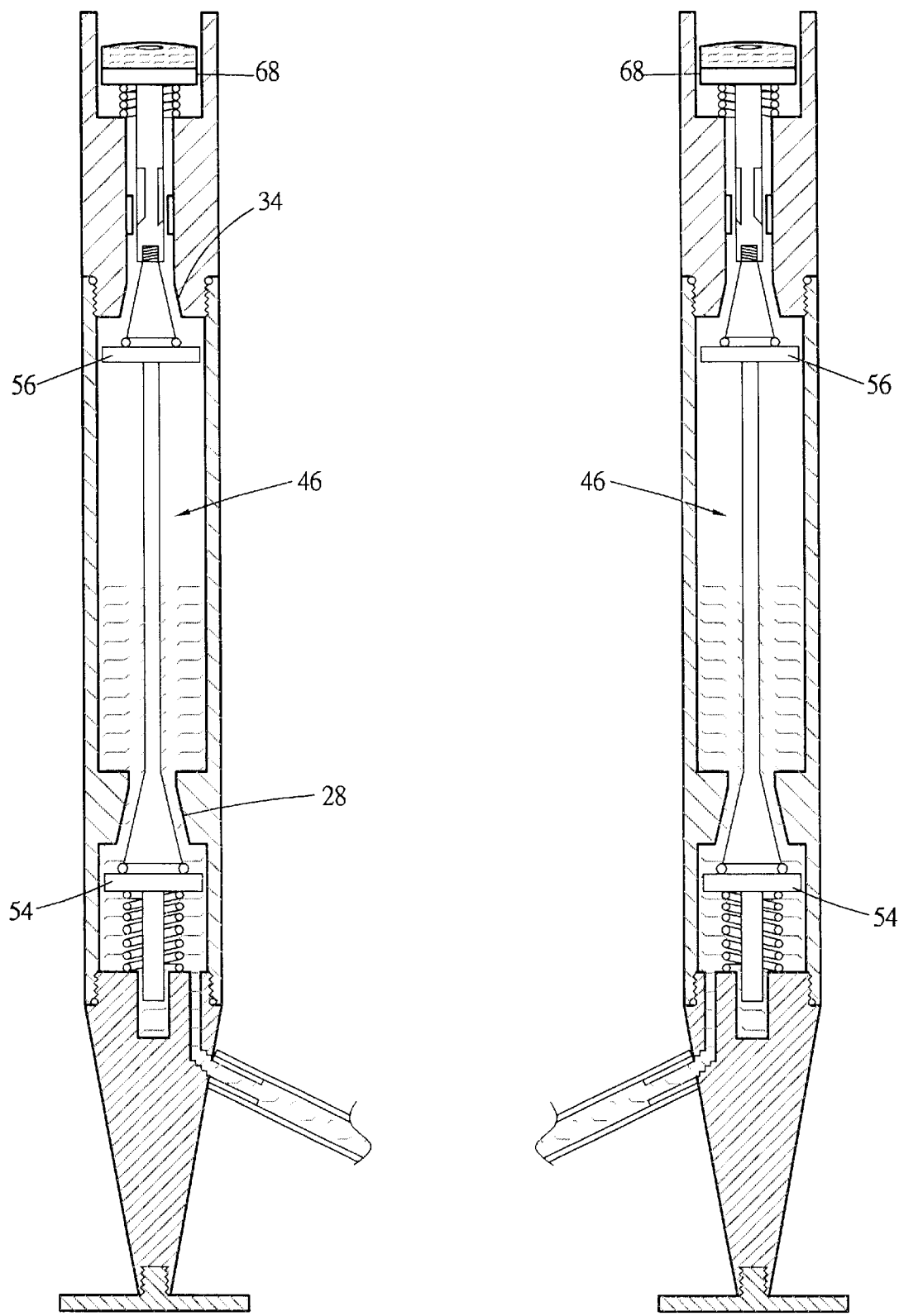
FIG. 4 is a sectional view of the first prefer embodiment of the present invention, showing a soft tube being working with it and the driving member and the controlling member returned to the initial positions.

After surveying, user only needs to release the pressing buttons 68, please refer to FIG. 4, the elastic devices 62 and 74 will drive the controlling members 14 returning to the initial positions to make the seal blocks 54 and 56 sealing the channels 28 and 34 again. Thus, the receiving chambers 24 of two aid apparatuses 10 and the soft tube 76 are isolated from outside. So, user only needs to eliminate the bubbles in the color liquid 78 before the first time use, there will be no more bubble formed in the color liquid 78.

Figures 5, 6:
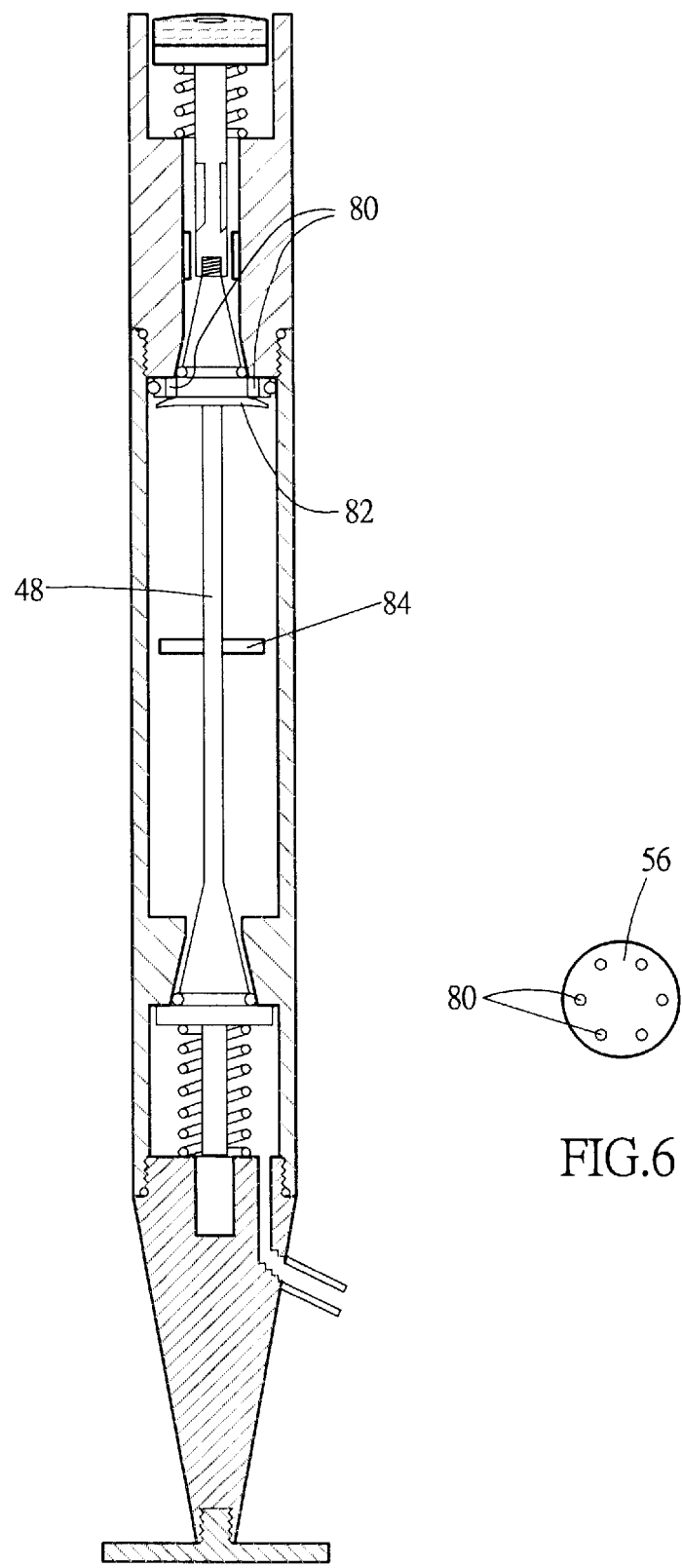
FIG. 5 is a sectional view of a second prefer embodiment of the present invention.
FIG. 6 is a topside view of the seal block of the second prefer embodiment of the present invention.

Please refer to FIG. 5 and FIG. 6, a second prefer embodiment of the present invention provides an aid apparatus for surveying level, which mainly has a structure as same as the first prefer embodiment, except that we provide apertures 80 at the seal block 56 and an elastic spacer 82 at the movable bar 48 attaching to the seal block 56. The apertures 80 are for getting the air in the receiving chamber 24 out of to facilitate user to drive it to shift. The spacer 82 is for preventing the color liquid 78 escaping from the apertures 80. We further provide a float board 84 in the second prefer embodiment, which is mounted on the movable bar 48 of the controlling member 14 for free sliding. The float board 84 will float on the surface of the color liquid 78 for facilitating user to identify the top surface of the color liquid 78.

I have to mention here, the driving member 16 of the present invention is to drive the controlling member 14 to shift. The driving member also can borrow from the pressing assembly of a propelling pencil (not shown in FIG.). It will achieve the same function.

The advantage of the aid apparatus for level surveying instrument of the present invention is that there is no bubbles formed in the surveying instrument to affect the accuracy of surveying. User only needs to squeeze the soft tube for getting out the bubbles in first time use.

What is claimed is:

1. An aid apparatus for level surveying instrument, comprising:
    a housing having a receiving chamber therein, a channel at one end of said receiving chamber, a window at one side of said receiving chamber, and a socket opening at a side wall of said housing connecting to said receiving chamber via said channel;
    a controlling member slidably received in said housing; said controlling member having a first seal block to seal said channel for isolating said receiving chamber from said socket opening; and
    a driving member provided at said housing for driving said controlling member to shift, whereby said first sealing block is driven by said driving member to seal said channel and to depart from said channel;
    wherein said controlling member has a movable bar received in said receiving chamber having a first end thereof fastening to said first seal block, and an elastic device having one end thereof bearing against said seal block and the other end thereof bearing against said housing, and said controlling member further has a second seal block disposed at a second end of said movable bar.

2. The aid apparatus for level surveying instrument as defined in claim 1, wherein said first seal block has at least one aperture thereon, and an elastic spacer disposed at said moveable bar and attaching to said first seal block.

3. The aid apparatus for level surveying instrument as defined in claim 1, further comprising two O-rings disposed at said seal blocks respectively.

4. An aid apparatus for level surveying instrument, comprising:
    a housing having a receiving chamber therein, a channel at one end of said receiving chamber, a window at one side of said receiving chamber, and a socket opening at a side wall of said housing connecting to said receiving chamber via said channel;
    a controlling member slidably received in said housing; said controlling member having at least one seal block to seal said channel for isolating said receiving chamber from said socket opening; and
    a driving member provided at said housing for driving said controlling member to shift, whereby said sealing block is driven by said driving member to seal said channel and to depart from said channel;
    wherein said driving member has a pressing device, which has one end thereof connecting to said controlling member, and an elastic device, which has one end thereof bearing against said pressing device and another end thereof bearing against said housing,
    wherein said pressing device has a pressing button and a linking rod, said linking rod has one end thereof fastening to said pressing button and another end thereof connecting to said controlling member, wherein said pressing button is a hollow element, which receives liquid therein, and said liquid has a bubble.

5. An aid apparatus for level surveying instrument, comprising:
    a housing having a receiving chamber therein, a channel at one end of said receiving chamber, a window at one side of said receiving chamber, and a socket opening at a side wall of said housing connecting to said receiving chamber via said channel;
    a controlling member slidably received in said housing; said controlling member having at least one seal block to seal said channel for isolating said receiving chamber from said socket opening; and
    a driving member provided at said housing for driving said controlling member to shift, whereby said sealing block is driven by said driving member to seal said channel and to depart from said channel;
    wherein said housing has a tube body, a first cover disposed at one end of said tube body, and a second cover disposed at another end of said tube body, said driving member disposed at said first cover, said channel disposed at one end of said tube body, and said socket opening disposed at said second cover, wherein said first cover further has a channel at an interior end thereof, said controlling member further has a second seal block corresponding to said channel of said first cover.

* * * * *